Oct. 2, 1928.

A. O. AUSTIN 1,685,833

PROCESS OF MANUFACTURING INSULATOR PINS

Filed July 29, 1922

Inventor
Arthur O. Austin
By Nissen & Crane
Attorney

Oct. 2, 1928.  
A. O. AUSTIN  
1,685,833  
PROCESS OF MANUFACTURING INSULATOR PINS  
Filed July 29, 1922    3 Sheets-Sheet 3
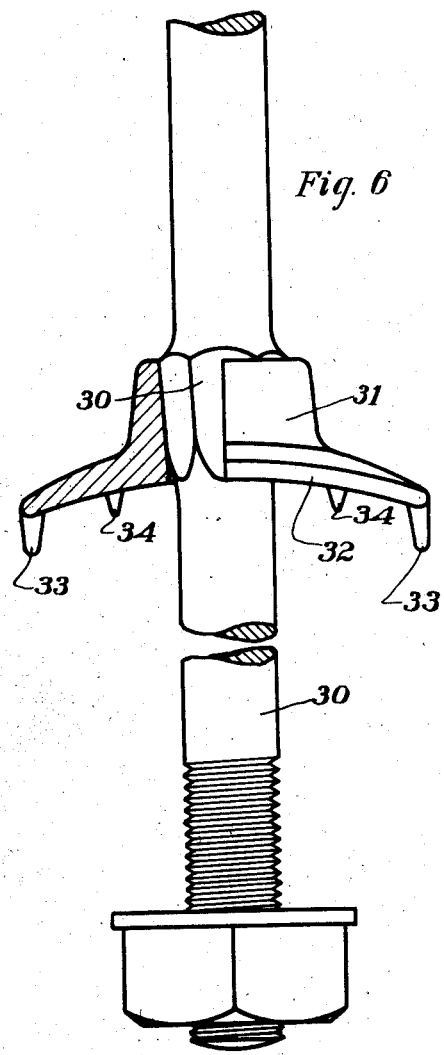
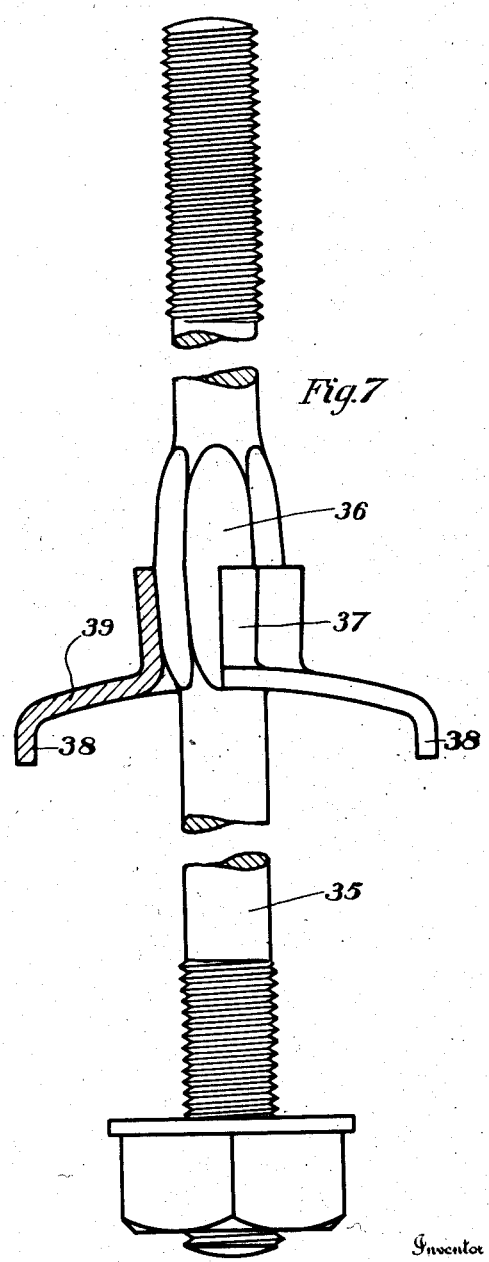

Patented Oct. 2, 1928.

1,685,833

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

PROCESS OF MANUFACTURING INSULATOR PINS.

Application filed July 29, 1922. Serial No. 578,469.

This invention relates to pins for supporting insulators for electric wires or other electric conductors, particularly on wooden cross arms, and to the method of manufacturing such pins. It has for its object, the provision of insulator pins which shall be efficient in operation, economical to manufacture, convenient to install and in which the strength of the pin is not impaired by weak portions. Other objects will appear from the following description.

The invention is exemplified in the combination and arrangement of parts shown in the accompanying drawings and described in the following specification, and it is more particularly pointed out in the appended claims.

In the drawings:

Fig. 6 is an elevation of another form of the invention.

Fig. 7 is an elevation of still a different modification.

Figures 1, 2, 3:
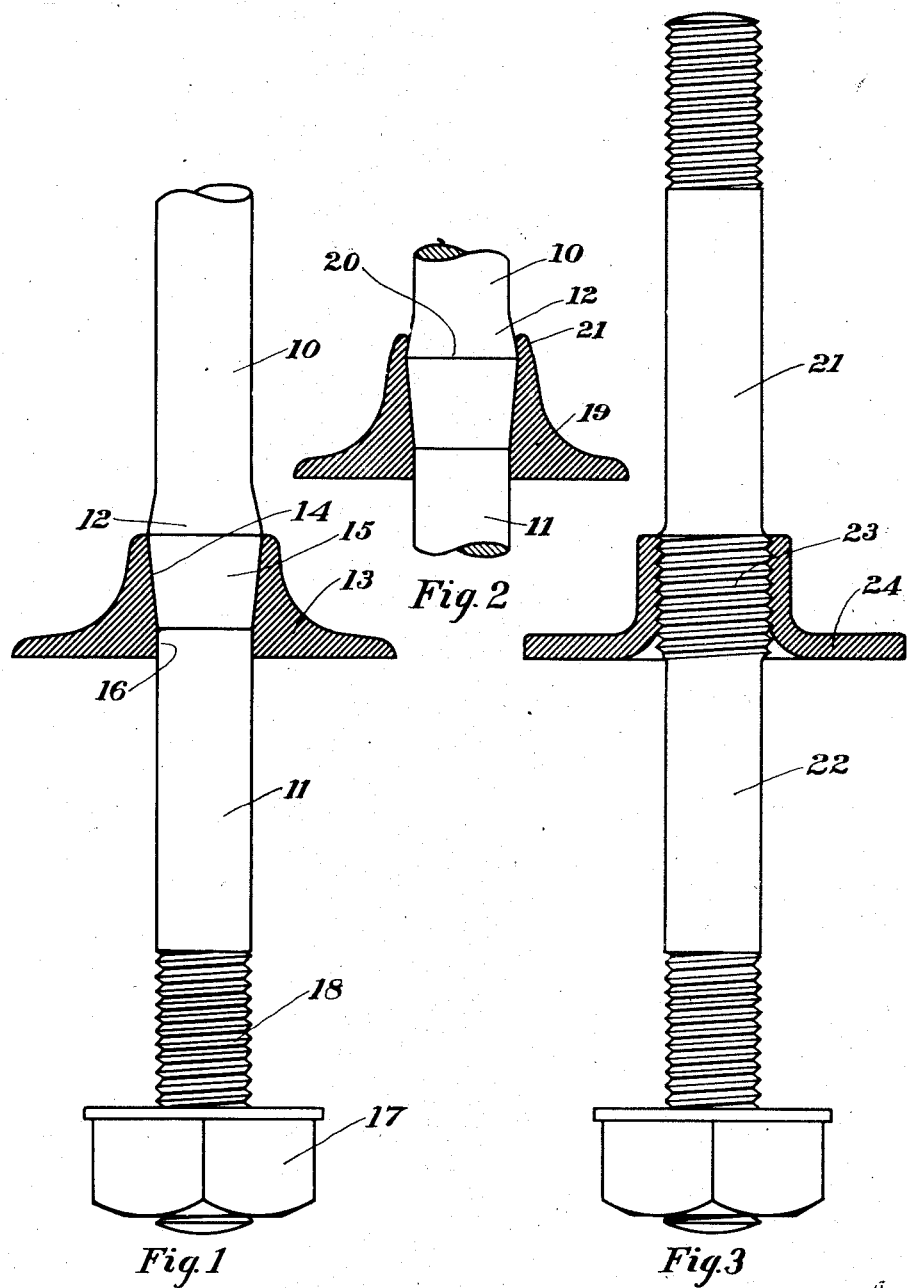
Fig. 1 is an elevation with parts in section, showing one embodiment of the present invention.
Fig. 2 shows a slight modification of the form of the invention shown in Fig. 1.
Fig. 3 shows a different modification of the invention.

Referring first to the form of the invention shown in Fig. 1, the pin is shown therein having an upper portion 10 and a lower portion 11 which may be formed from a single piece of stock, the two portions being of the original diameter of the stock. Between the parts 10 and 11 is an enlarged portion 12 which is formed by upsetting the rod from which the pin is made intermediate the upper and lower portions 10 and 11. In forming the upset portion 12, the rod is grasped at spaced position by a power tool and the parts thus grasped are moved toward one another to upset the material and thus form the enlargement 12. This operation may be performed with the stock either hot or cold.

The jaws which grasp the rod are shaped to provide dies for forming the upset or enlarged portion. This enlargement provides a stop which engages a supporting member or flange 13 which rests on the support for the pin which may be a cross arm or other suitable supporting structure. The flange 13 is provided with an opening having a tapered surface 14 to conform to the tapered surface 15 of the enlarged portion 12. Below the tapered portion 14, a straight part 16 may be provided to engage a portion of the shank 11, but the top parts may be shaped to provide tapered surfaces thruout the entire length of engagement. The lower end of the part 11 may be secured to the under side of the supporting structure by means of a nut 17 engaging threads 18 formed on the lower end of the pin. Other means of securing the pin in place in the opening may, of course, be employed.

By increasing the size of the pin to provide a bearing, the shank 11 may have the same diameter as the upper portion of the pin, thus providing a larger bearing surface of the pin on the interior of the opening thru the cross arm, than would be possible if the lower portion of the pin were reduced to provide a supporting shoulder. This also secures reinforcement for the pin at the top of the supporting member 13 where the bending moment due to the load is greatest.

In the form of support shown in Fig. 2, the upset portion 12 is provided in the manner described in connection with Fig. 1, and the supporting flange 19 is similar to the flange 13 except that it is permitted to extend above the line 20 of maximum diameter of the pin. The portion 21 which extends above the line 20 is pressed inwardly against the inwardly tapering portion of the enlargement 12. This may be accomplished by a suitable die pressed against the upper end of the support 19. After the support is in place on the pin the part may be turned in in any other suitable manner. When once pressed into place it provides an effective lock for retaining the pin and support in fixed position relatively to one another. If permanent connection between the parts as shown either in Fig. 1 or 2 is desired they may be galvanized after they are in place and the galvanized coating will assist in holding the parts against relative movement.

In the form of the invention shown in Fig. 3, the pin is provided with upper and lower parts 21 and 22 respectively, and an intermediate enlarged part 23 which is formed by upsetting the stock between the ends of the pins as previously described. In this form of pin, however, in place of the tapered bearing 15 the upset portion is threaded to receive a threaded flange member 24. The threads may be cut in the expanded part 23, but in some cases it may be more economical to roll rather than to cut the threads.

It will be noted that the threads do not weaken the pin as they are formed in the stock bulged outwardly by the upset process and do not enter the stock sufficiently deep to provide a diameter at the roots of the threads less than the original diameter of the stock. The root diameter of the threads may be as shown in the drawing, even greater than the diameter of the remaining portion of the pin.

Figures 4, 5:
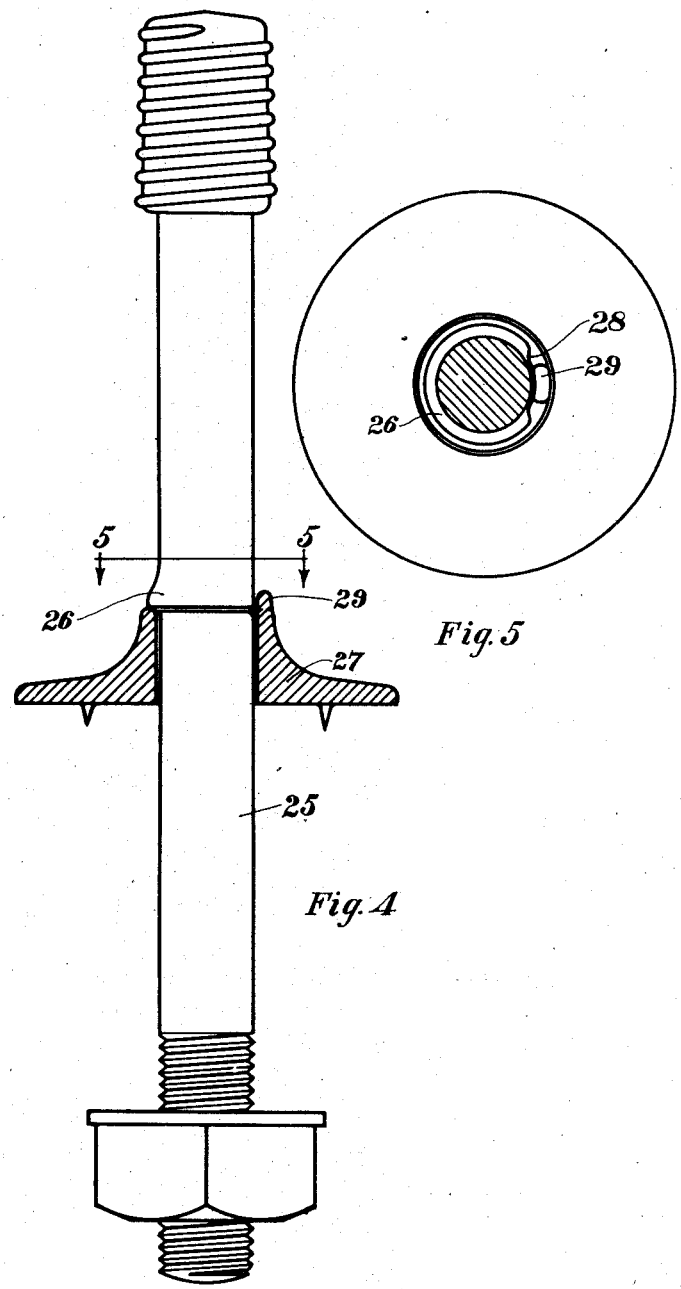
Fig. 4 shows still another form of the invention.
Fig. 5 is a section on line 5—5 of the Fig. 4.

In the form of invention shown in Figs. 4 and 5, the rod 25 is upset between the ends to form a ring 26 which rests upon the upper portion of the supporting member 27. The ring may be discontinued for a portion of the periphery of the rod as shown in 28 and a projection 29 is provided to register with the opening 28 in the ring 26 and limit the rotary movement of the pin in its support. Since the lower portion of the pin is the full size of the rod, it will have a sufficient bearing in the opening thru the cross arm to stand lateral stresses and the chief function of the support 27 will be merely to support the pin against downward movement. It is necessary, therefore, to provide a tight fit between the pin and its support, but the parts may be permitted to fit sufficiently loosely to allow a limited rotary movement of the pin for alignment of the supporting groove in the insulator with the line wire.

In Fig. 6 a pin 30 is upset between its ends to form an enlargement 31 which is hexagonal in cross section and tapered to fit into a correspondingly shaped socket in a supporting member having a flange 32 curved to fit the top of a rounded cross arm. The flange 32 may have lugs 33 to engage the sides of the cross arm and teeth 34 to assist in holding the flange and consequently the pin against rotation.

The pin 35 shown in Fig. 7 is upset to provide an angular shaped enlargement 36 at its central portion. The enlargement 36 is tapered in both directions so that it may be placed in the tapered seat of the socket 37, either end up. If the ends of the pin are of different lengths this makes it possible to use one style of pin for more than one set of conditions. This support 37 has the edges 38 of the flange 39 bent downwardly to grasp the sides of the cross arm.

Where the body of the pin is of the same diameter both above and below the flange, a relatively small base may be used as the portion below the flange can act as a beam being held in position by its bearing on the sides of the hole in the cross arm. Since little dependence need be placed on the portion in the arm acting as a tension member, the shrinkage of the arm and release of tension will have little effect upon the carrying capacity of the pin.

In general, the friction in the tapered base prevents rotation of the body when same is tightened on the arm. Where it is desired, the tapered section fitting into the base may be made into the frustum of a hexagonal pyramid or any other suitable shape as shown in Figs. 6 and 7. This section engages a corresponding socket in the base which in turn is locked to the arm by lugs or an overlap on the arm. In most cases, the curvature of the base and a roofed arm are sufficient to lock the pin from rotation.

I claim:

1. The process of manufacturing insulator pins comprising the steps of upsetting a metal bar between its ends to produce an enlargement thereon, separately forming a supporting member and applying said member to said enlargement to form a support for said pin.

2. The process of manufacturing an insulator pin comprising the steps of upsetting between its ends, a bar of substantially uniform diameter to provide an enlarged reinforcing portion, separately forming a supporting flange with a sleeve to fit said enlarged reinforcing portion and applying said supporting flange to said enlarged reinforcing portion.

3. The process of manufacturing insulator pins comprising the steps of upsetting a bar between its ends, to provide an enlarged portion, tapering the enlarged portion, separately forming a support having a sleeve thereon, shaping said sleeve to fit said enlarged tapered portion and applying said sleeve to said enlarged tapered portion.

4. The process of manufacturing insulator pins comprising the steps of upsetting, between its ends, a bar of substantially uniform diameter to provide an enlarged reinforcing portion, tapering said enlarged reinforcing portion toward one end of said pin by said upsetting operation, and shaping said enlarged portion by said upsetting operation to a non-circular contour, separately forming a support having a sleeve thereon, shaping said sleeve to fit the tapered non-circular portion of said bar and applying said sleeve to said enlarged portion.

In testimony whereof I have signed my name to this specification on this 25th day of July, A. D. 1922.

ARTHUR O. AUSTIN.